UNITED STATES PATENT OFFICE.

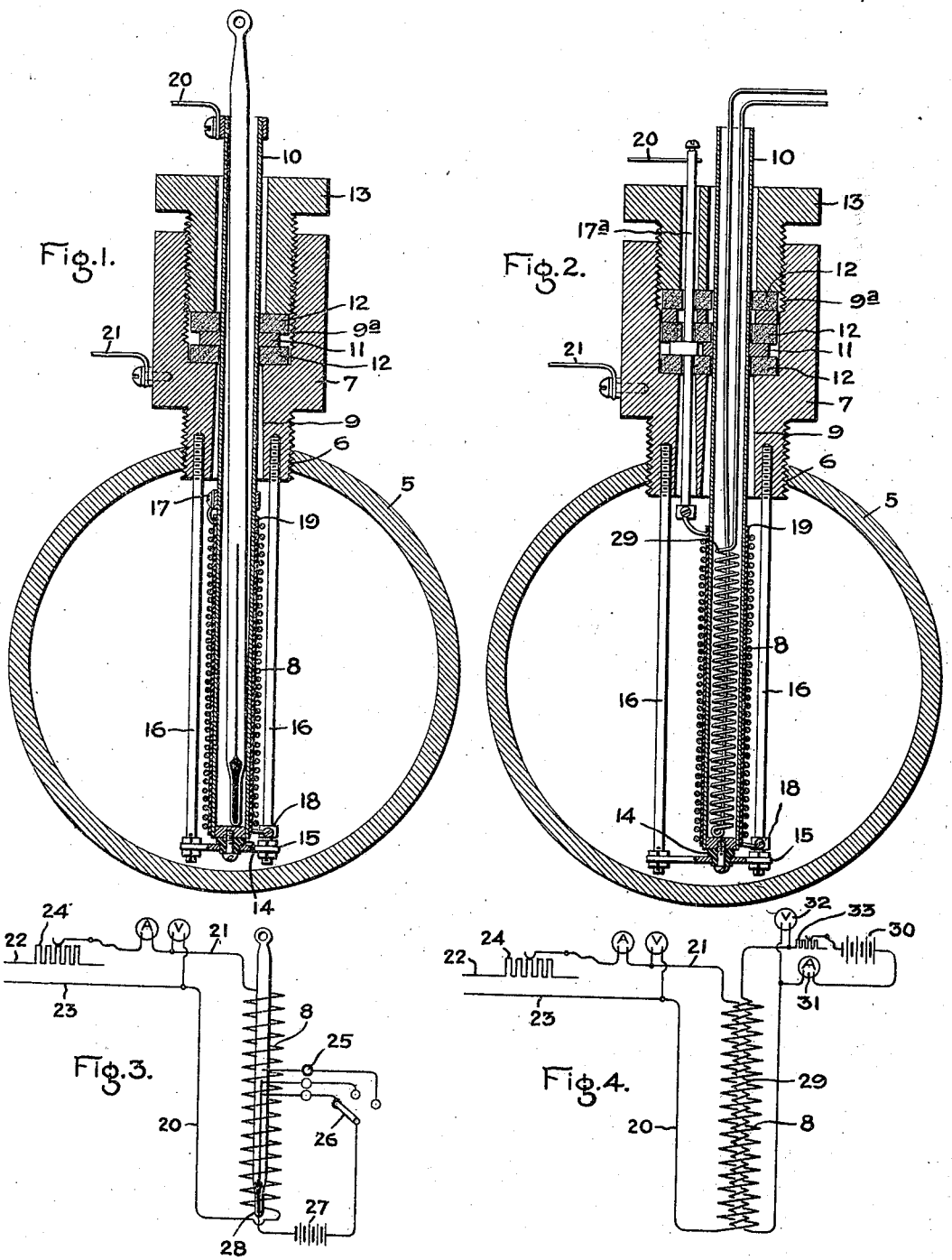

LAWRENCE A. SIMMONS, OF SCHENECTADY, NEW YORK, ASSIGNOR TO GENERAL ELECTRIC COMPANY, A CORPORATION OF NEW YORK.

FLOW-METER.

1,156,638. Specification of Letters Patent. Patented Oct. 12, 1915.

Application filed January 13, 1914. Serial No. 811,853.

*To all whom it may concern:*

Be it known that I, LAWRENCE A. SIMMONS, a citizen of the United States, residing at Schenectady, county of Schenectady, State of New York, have invented certain new and useful Improvements in Flow-Meters, of which the following is a specification.

My invention relates to flow meters, and particularly to such instruments of the type wherein the flow of fluid is measured by measuring the energy required to hold a body or radiator subjected to the action of the flowing fluid being metered at a fixed temperature.

If a body or radiator maintained at a fixed temperature by suitable means be subjected to the action of a flowing fluid, there will be a transfer of heat between the same, the quantity of which will be practically proportional to the rate of flow of the fluid. By measuring, therefore, the energy required to maintain the body or radiator at constant temperature the rate of flow can be determined.

In an apparatus of this character, it is obviously of primary importance that the radiator be maintained at the fixed constant temperature selected, and hence suitable means must be provided to indicate accurately the temperature of the radiator. In an instrument of the above referred to type an electrically heated resistance is an advantageous form of radiator as the same can be conveniently arranged to be subjected to the action of the flowing fluid and the energy supplied to the same can be readily varied and measured. As it well known, the resistance of a conductor is a function of the temperature and this fact has been taken advantage of as a means for indicating the temperature of the resistance and keeping it constant. Considerable difficulty has been encountered, however, in accurately measuring the resistance and holding it constant due to the variables introduced with variations in flow, it being obvious, for example, that a slight drop in temperature due to an increase in flow would lower both the temperature of the resistance element and also its resistance. It has also been found by actual experience that the resistance of the conductor tends to change from time to time, due probably, to the action of the fluid thereon. This has necessitated the frequent calibration of instrument.

The object of my present invention is to provide an instrument using an electric conductor as the radiator, in which the means for indicating the temperature is independent of the resistance value of the radiator.

Referring to the drawing wherein I have illustrated certain forms which my invention may take, Figure 1 shows my invention applied to a conduit through which the fluid to be metered flows; Fig. 2 shows a second form of my invention, and Figs. 3 and 4 are wiring diagrams showing the manner of connecting the forms of the invention as shown respectively in Figs. 1 and 2.

Referring first to Fig. 1, 5 indicates the conduit through which the fluid to be metered flows. This may be steam, air, or other fluid. A suitable opening 6 is formed in the tube into which is threaded a plug 7 which forms a support for the radiator 8. The support as well as the radiator may take various forms. In the form illustrated, I have shown the plug 7 as having a central bore 9 counterbored as shown at 9ᵃ. Passing through the bore 9 is a tube 10, preferably formed of some material which is an electrical conductor. The outer end of the tube is supported in spaced relation to the plug 7 by means of the flange 11 and insulating washers 12 clamped in place by the hollow nut 13. These washers 12 are preferably formed of a heat resisting material as asbestos. The lower end of the tube is supported by the insulating bushing 14 on cross piece 15 which in turn is carried by the posts 16 threaded at one end into the plug 7. By this arrangement the tube 10 is insulated from the conduit and plug and may form one circuit terminal 17 of the resistance 8, the other terminal being grounded on the conduit as shown at 18. The portion of the tube 10 which is within the conduit is covered with a suitable coating of insulating material 19 and upon this is arranged the resistance 8, the same being shown as wound thereon in the form of a helix and preferably of such a length as to extend substantially across the conduit, this being desirable since the velocity of flow varies at different points of the cross section.

As diagrammatically indicated in Fig. 3, the terminals 17 and 18 are connected by way of conductors 20 and 21 with mains 22 and 23 which may be connected with any suitable source of power. An adjustable resistance 24 is arranged in one of the conductors, 21. A suitable instrument for indicating the power supplied to the resistance 8 is connected up with the circuit. As a simple example I have illustrated an ammeter and a voltmeter from the readings of which the power may be deduced. Knowing the power, the rate of flow may be read from suitable tables or curves. Obviously I may use any known form of instrument which will answer the purpose. As a means for indicating the temperature of the radiator 8 I insert through the outer open end of the tube 10 a suitable thermometer. This thermometer may be an ordinary mercury thermometer as shown in Figs. 1 and 3 and it may be read directly, or I may use a suitable form of electrical indicating means in connection therewith as shown in Fig. 3. Such indicators are well known and I have, therefore, illustrated the same diagrammatically as comprising a series of indicators as lights 25, connected on one side to spaced points on the thermometer corresponding to given temperatures and on the other to the contacts of switch 26. The switch arm of switch 26 is connected to one terminal of battery 27, the other terminal being connected as at 28 to the mercury in the bulb of the thermometer. As many of these lights may be provided as found desirable.

In the operation of the arrangement shown in Figs. 1 and 3, the thermometer having been inserted inside tube 10, the resistance 24 is adjusted until the thermometer indicates that the desired temperature for the radiator 8 has been reached. Resistance 24 will then be adjusted from time to time as changes in the flow occur to hold this desired temperature. By determining the power supplied to the radiator 8 at any instant the amount of steam flow can be deduced therefrom.

Referring now to Fig. 2, the structural arrangement shown is substantially the same as that in Fig. 1 except that in place of using the tube 10 as one terminal for radiator 8 I provide a separate terminal 17ª in the form of a rod suitably spaced and insulated from plug 7 as shown, and I have accordingly applied the same reference numerals to corresponding parts in Fig. 2 as used in Fig. 1. In place of the mercury thermometer as shown in Fig. 1, however, I use a suitable form of electrical thermometer. The same is illustrated as comprising a resistance wire 29 connected in circuit with a source of electrical energy 30 and some suitable form of indicating means as shown in Fig. 4. I have illustrated an ammeter 31, a voltmeter 32, and an adjustable resistance 33, as arranged in this circuit and by means of which the resistance of wire 29 at any instant may be indicated. Obviously with constant potential impressed on the wire 29 the current flowing therethrough will be a measure of the temperature and the ammeter 31 may accordingly have a scale calibrated to read temperature direct.

In either of the forms of my invention as illustrated the means for measuring the temperature of the radiator is independent of the resistance of the radiator. Such means is also protected from any action by the flowing fluid to be metered, being inclosed within the tube about which the radiator is coiled. By this arrangement I obtain an accurate measurement of the temperature of the radiator in a simple and reliable manner.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a flow meter, a conduit, a heat radiating element therein so arranged that there is a transfer of heat between it and the flowing stream of fluid, a source supplying energy to the radiating element to heat the same, means for regulating the supply from said source to maintain the radiating element substantially at a constant temperature, means independent of the radiating element and the flowing stream of fluid but subjected to the temperature of the radiating element for measuring the temperature of the radiating element, and means for measuring the energy supplied to the heat radiating element.

2. In a flow meter, a conduit, an electrical resistance forming a heat radiating element therein, a source of electrical energy connected to the resistance, means for regulating the supply from said source, means for measuring the energy supplied thereto, and means independent of the resistance value of the electrical resistance element but subjected to the temperature thereof for indicating the temperature of the electrical resistance.

3. In a flow meter, a conduit, an electrical resistance forming a heat radiator therein, said electrical resistance being arranged as a tubular member, a source of electrical energy connected to the resistance, means for regulating the supply from said source, means for measuring the energy supplied to the resistance, and a temperature indicating device inserted into the tubular member.

4. In a flow meter, a tube adapted to be inserted into the path of flow of a fluid, an electrical resistance arranged on said tube and forming a heat radiator, a source of electrical energy connected to the resistance, means for regulating the supply from said source, means for measuring the energy supplied to said resistance, and means in said tube for indicating the temperature of said resistance.

In witness whereof, I have hereunto set my hand this 12th day of January, 1914.

LAWRENCE A. SIMMONS.

Witnesses:
MARGARET E. WOOLLEY,
HELEN ORFORD.

Copies of this patent may be obtained for five cents each, by addressing the "Commissioner of Patents, Washington, D. C."